United States Patent
Ayukawa

Patent Number: 5,803,849
Date of Patent: Sep. 8, 1998

[54] BELT TENSIONER

[75] Inventor: Kazumasa Ayukawa, Nara, Japan

[73] Assignee: Unitta Company, Osaka, Japan

[21] Appl. No.: 661,559

[22] Filed: Jun. 11, 1996

[30] Foreign Application Priority Data

Jun. 14, 1995 [JP] Japan ................... 7-171359
Oct. 23, 1995 [JP] Japan ................... 7-299206

[51] Int. Cl.⁶ .................................... F16D 3/12
[52] U.S. Cl. ................................ 474/94; 474/135
[58] Field of Search ................ 474/94, 101, 109, 474/133, 135

[56] References Cited

U.S. PATENT DOCUMENTS

| | | |
|---|---|---|
| 4,696,663 | 9/1987 | Thomey et al. . |
| 4,983,145 | 1/1991 | Hirai et al. ............... 474/117 |
| 5,149,306 | 9/1992 | Sidwell . |
| 5,470,280 | 11/1995 | Ayukawa . |
| 5,478,285 | 12/1995 | Bakker et al. . |
| 5,540,627 | 7/1996 | Miyata ............... 474/135 X |

FOREIGN PATENT DOCUMENTS

| | | |
|---|---|---|
| 3512376 | 10/1985 | Germany . |
| 4429270 | 9/1995 | Germany . |
| 5-67854 | 9/1993 | Japan . |
| 2157391 | 10/1985 | United Kingdom . |
| 2287768 | 9/1995 | United Kingdom . |

Primary Examiner—Roger J. Schoeppel
Attorney, Agent, or Firm—Greenblum & Bernstein P.L.C.

[57] ABSTRACT

A belt tensioner has a tensioner and a tensioner arm. The tensioner cup has an opening, and the tensioner arm has a lid portion formed at one end. The lid portion is rotatably connected to the cup and extends so as to close the opening thereof. The tensioner also has a torsion spring provided in the cup to act between the cup and the arm so as to elastically urge the arm in a rotational direction. A damping member is secured to the lid portion of the arm such that an outer circumferential surface of the damping member is in sliding contact with an inner circumferential surface of the cup. Further, the tensioner has a ring-like spring provided in the damping member so as to elastically urge the damping member against the inner circumferential surface of the cup. The lid portion of the arm has at least two columnar pin-like elements protruding therefrom parallel with a swing axis of the lid portion of the arm, and the columnar pin-like elements are inserted in holes formed in the damping member. Thus, the damping member is prevented from being moved in both the rotational and radial directions with respect to the lid portion of the arm.

17 Claims, 9 Drawing Sheets

BELT TENSIONER

BACKGROUND OF THE INVENTION

1. Field of the Invention

The present invention relates to an improvement in a belt tensioner, mainly and advantageously utilized in a belt driving system for an automotive engine.

2. Description of the Related Art

Such a belt tensioner is used in order to positively transmit a driving force by preventing slack when the driving force is transmitted to a plurality of devices by a single belt. This type of belt tensioner is disclosed in publications such as Japanese Unexamined Utility Model Publication (Kokai) No. 5-67854.

In a conventional belt tensioner such as disclosed in the above-mentioned publication, a tensioner arm has a lid portion formed at one end thereof, and the lid portion is rotatably connected to a stationary cup member fixed to an engine block. Also, the tensioner arm has a pulley rotatably attached to the other end thereof, and the pulley is adapted to be engaged with a belt of a belt driving system for an automotive engine. A torsion spring is provided in the stationary cup member to act between the cup member and the tensioner arm, and thus the tensioner arm is rotationally urged such that the pulley tensions the belt.

The tensioner arm is provided with an annular damping member attached to the lid portion thereof, and an outer circumferential surface of the damping member comes in sliding contact with an inner circumferential surface of the stationary cup member. In particular, the annular damping member has some projections protruding from an inner circumferential surface thereof and arranged at suitable intervals, and the projections are engaged in grooves or recesses formed in the lid portion of the tensioner arm so as to prevent relative rotation therebetween. Also, the annular damping member has a spring provided at the inner circumferential surface thereof, and the spring serves to urge the annular damping member against the stationary cup member. Namely, the annular damping member is elastically urged against the stationary cup member. Thus, during rotation of the tensioner arm, a damping force or frictional force is produced between the annular damping member and the stationary cup member, and a rotational resistance is given to the tensioner arm.

Nevertheless, in the conventional belt tensioner as mentioned above, when the outer circumferential surface of the annular damping member is subjected to abrasion and wear, the annular damping member becomes loose so that a circumferential portion of the damping member is movable in the radial direction with respect to the lid portion of the tensioner arm. Thus, a clearance is produced between the projections of the damping member and the grooves or recesses of the tensioner, which produces noise of the members striking against each other etc. during the swing movement of the tensioner arm. In short, with the arrangement of the conventional belt tensioner, a secure and tight attachment of the damping member to the lid portion of the tensioner arm is directly damaged by the abrasion and wear of the damping member to thereby cause looseness of the damping member, undesirably resulting in relative movement between the damping member and the lid portion of the tensioner arm.

On the other hand, conventionally, the damping member is frequently formed of nylon or polyacetal. When use is made of nylon, frictional noise is produced between the sliding contact surfaces of the damping member and stationary cup member. Also, when use is made of polyacetal, there is no production of frictional noise, but the polyacetal damping member is subjected to premature abrasion and wear, and is susceptible to cracks at a location where stresses are concentrated.

SUMMARY OF THE INVENTION

Therefore, an object of the present invention is to provide a belt tensioner constituted such that a damping force or frictional force can be produced at the sliding contact surfaces of the stationary cup member and damping member so that noise is suppressed even if the damping member is subjected to abrasion and wear.

Another object of the present invention is to provide a belt tensioner having a damping member formed of a resin material which can prevent production of frictional noise between the sliding contact surfaces of the damping member and stationary cup member, and which exhibits superior resistance to abrasion and wear.

In accordance with a first aspect of the present invention, there is provided a belt tensioner comprising a tensioner cup having an opening, a tensioner arm having a lid portion formed at one end thereof, the lid portion being rotatably connected to the tensioner cup and extended so as to close the opening of the tensioner cup, an elastic urging means provided in the tensioner cup to act between the tensioner cup and the tensioner arm so as to elastically urge the tensioner arm in a rotational direction, a damping member securely attached to the lid portion of the tensioner arm such that an outer circumferential surface of the damping member is in sliding contact with an inner circumferential surface of the tensioner cup and a ring-like spring provided in the damping member so as to elastically urge the damping member against the inner circumferential surface of the tensioner cup. The lid portion of the tensioner arm is provided with at least two columnar pin-like elements protruding therefrom parallel with an swing axis of the lid portion of the tensioner arm, and the columnar pin-like elements are inserted in holes formed in the damping member, whereby the damping member is prevented from being moved in both rotational and radial directions with respect to the lid portion of the tensioner arm.

According to the first aspect of the present invention, the columnar pin-like elements and the holes may be arranged at positions offset from a center of the damping member. Preferably, the columnar pin-like elements and the holes are disposed at equal positions in the radial direction from the center of the damping member.

Also, the damping member preferably has an insertion portion integrally formed therewith, and the holes are formed in the insertion portion thereof, and the insertion portion of the damping member may be arranged along an inner periphery of the damping member. More preferably, the damping member comprises an annular body, and the insertion portion of the damping member is integrally extended from a side of the annular body. Further, the annular body is split so as to form a gap therein, and the insertion portion of the damping member is diametrically arranged at a side opposite to the gap of the annular body.

The belt tensioner may comprise at least one ring-like spring element provided in the damping member such that the outer circumferential surface of the damping member is elastically urged against an inner circumferential surface of the tensioner cup. Preferably, the ring-like spring comprises a C-shaped ring spring. Also, the holes of the damping member fit over the columnar pin-like element with substantially no clearance therebetween, and the holes of the damping member and columnar pin-like element may have a circular cross-section.

In accordance with a second aspect of the present invention, there is provided a belt tensioner comprising a tensioner cup having an opening, a tensioner arm having a lid portion formed at one end thereof, the lid portion being rotatably connected to the tensioner cup and extended so as to close the opening of the tensioner cup, an elastic urging means provided in the tensioner cup to act between the tensioner cup and the tensioner arm so as to elastically urge the tensioner arm in one of rotational directions, and a damping member securely attached to the lid portion of the tensioner arm such that an outer circumferential surface of the damping member is in sliding contact with an inner circumferential surface of the tensioner cup. The damping member is formed of a partially-aromatic polyamide resin having a coefficient of dynamic friction of at most 0.20, a critical pressure-velocity value (PV) of at least 1400, and a specific wear volume of at most 0.20.

In the belt tensioner according to the second aspect of the present invention, the coefficient of dynamic friction may be about 0.16, and the critical pressure-velocity value (PV) may be about 1600. Also, the specific wear volume may be about 0.16. Preferably, the tensioner cup is formed of a suitable metal, and the metal may be formed of aluminum alloy.

BRIEF DESCRIPTION OF THE DRAWINGS

These objects and other objects of the present invention will be better understood from the following description, with reference to the accompanying drawings in which.

DESCRIPTION OF THE PREFERRED EMBODIMENTS

Figure 1:
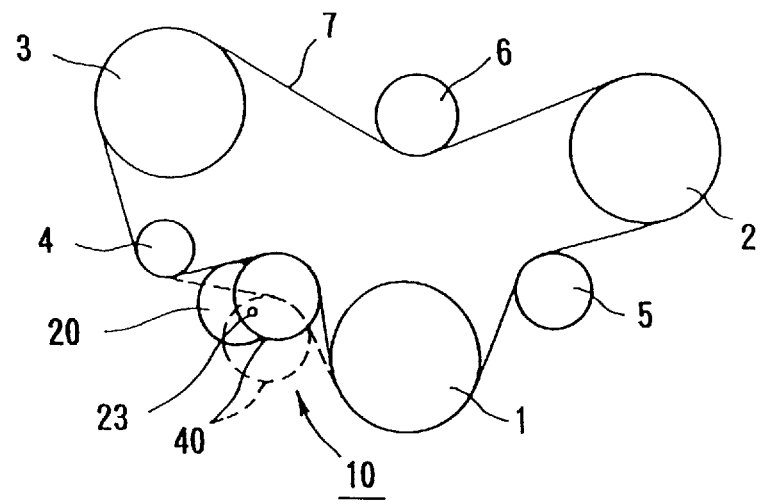
FIG. 1 is a schematic view showing a belt driving system for an automotive engine, in which a belt tensioner according to a first aspect of the present invention is incorporated.

FIG. 1 schematically shows a belt driving system of an automotive engine in which a belt tensioner according to a first aspect of the present invention is incorporated. The belt driving system comprises a drive pulley 1 mounted on an output shaft of the automotive engine (not shown), a drive pulley 2 for an air compressor, a drive pulley 3 for a power steering pump, a drive pulley 4 for an alternator, idler pulleys 5 and 6, and a single driving belt 7 stretched among the pulleys. The belt tensioner according to the first aspect of the present invention, generally indicated by reference numeral 10, is provided so as to be engaged with a section of the driving belt 7 between the pulleys 1 and 4.

The belt tensioner 10 comprises a stationary member 20 fixed to an engine block, and a tensioner pulley 40 swingably provided around a pivot bolt or swing shaft 23 with respect to stationary member 20. The tensioner pulley 40 is urged upward in FIG. 1 by biasing means provided in the stationary member 20, and the driving belt 7 is tensioned due to the urging force resulting from the biasing means. When the tensioner pulley 40 is moved around the pivot bolt 23 to a position shown by a broken line in the FIG. 1, the stretching or threading of the belt 7 among the pulleys 1 to 6 can be easily carried out.

Figure 2:
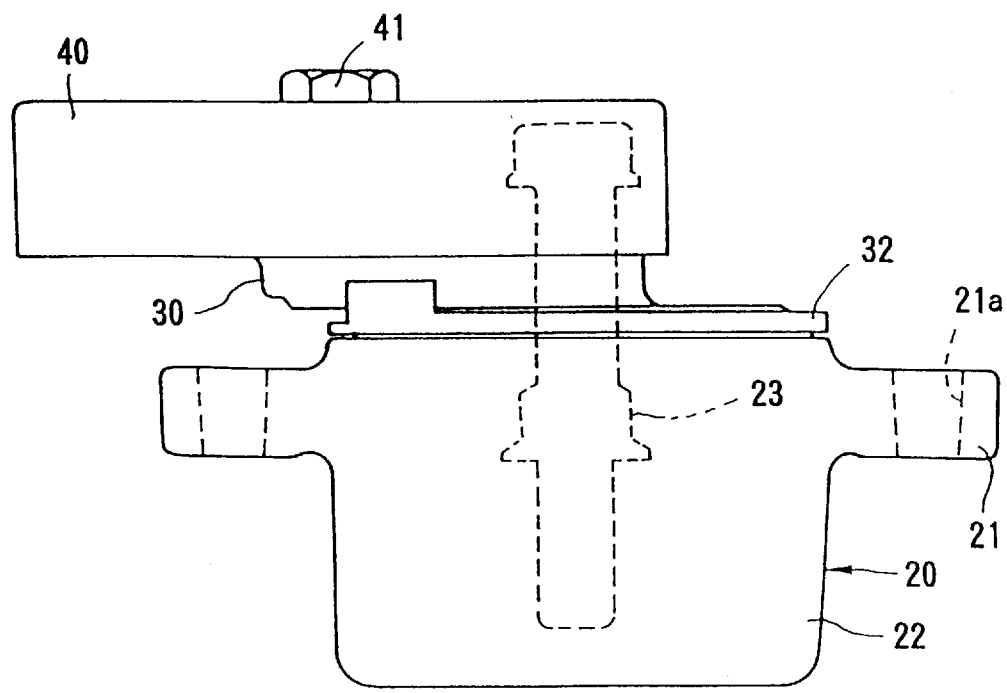
FIG. 2 is a side view showing an external appearance of the belt tensioner according to the present invention.

FIG. 2 shows an external appearance of the belt tensioner 10. As shown in this drawing, the stationary member 20 includes a mounting portion 21 formed with two attaching holes 21a into which bolts (not shown) are inserted for bolting to the engine block, and a tensioner cup 22 in which a torsion or spiral spring 50 (FIG. 3) is received. In the tensioner cup 22, a tensioner arm 30 is rotationally mounted on the swing shaft 23 so as to be swingable around the axis thereof. The tensioner pulley 40 is rotationally provided around a pulley bolt 41 supported by the tensioner arm 30, and the pulley bolt 41 is parallel to the swing shaft 23. The tensioner arm 30 has an annular damping member or friction member 32 attached thereto, and an outer circumferential surface of the the damping member 32 is in sliding contact with an inner circumferential surface of the tensioner cup 22.

Figure 3:
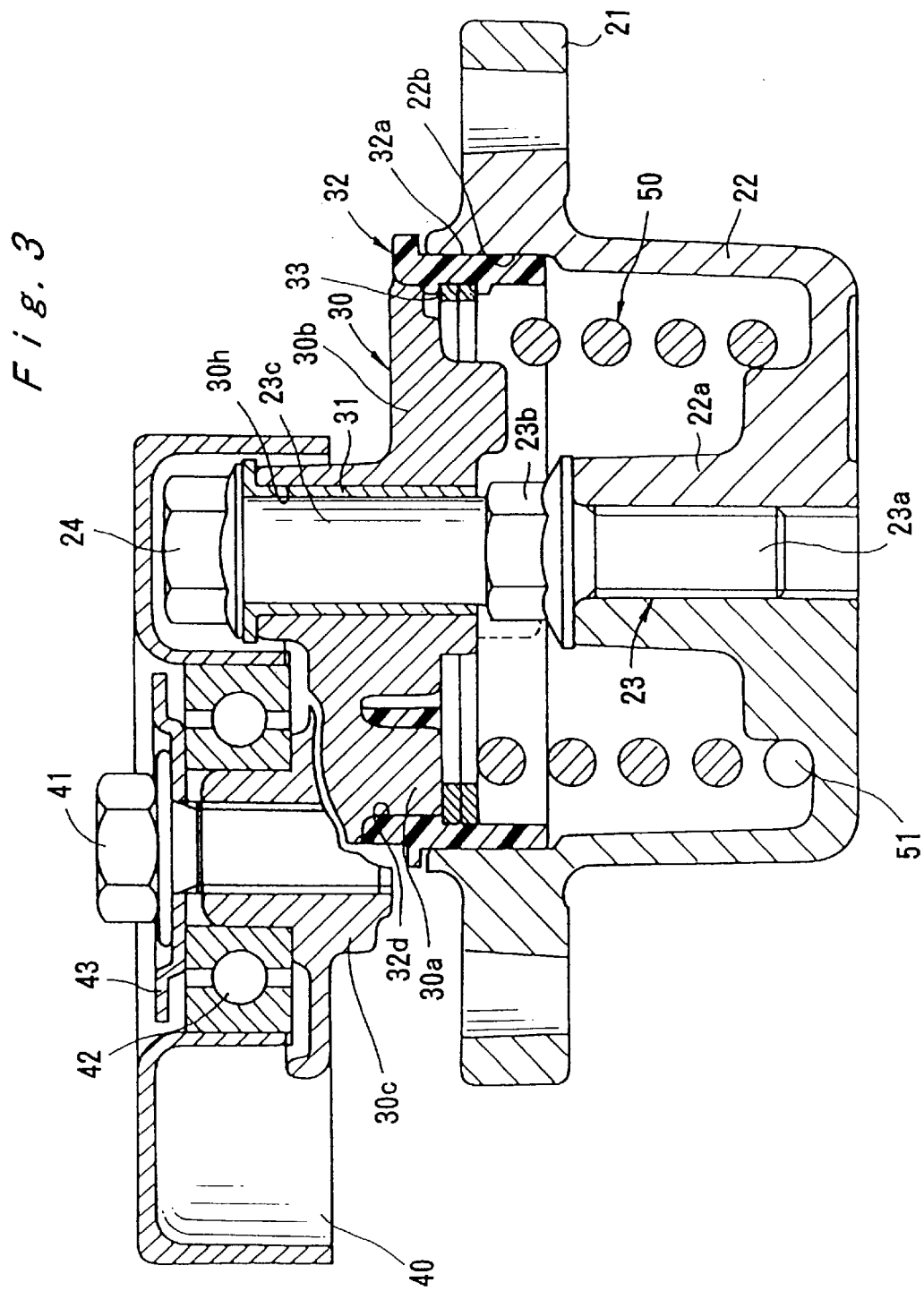
FIG. 3 is a longitudinal cross-sectional view of the belt tensioner of FIG. 2.
Figure 4:
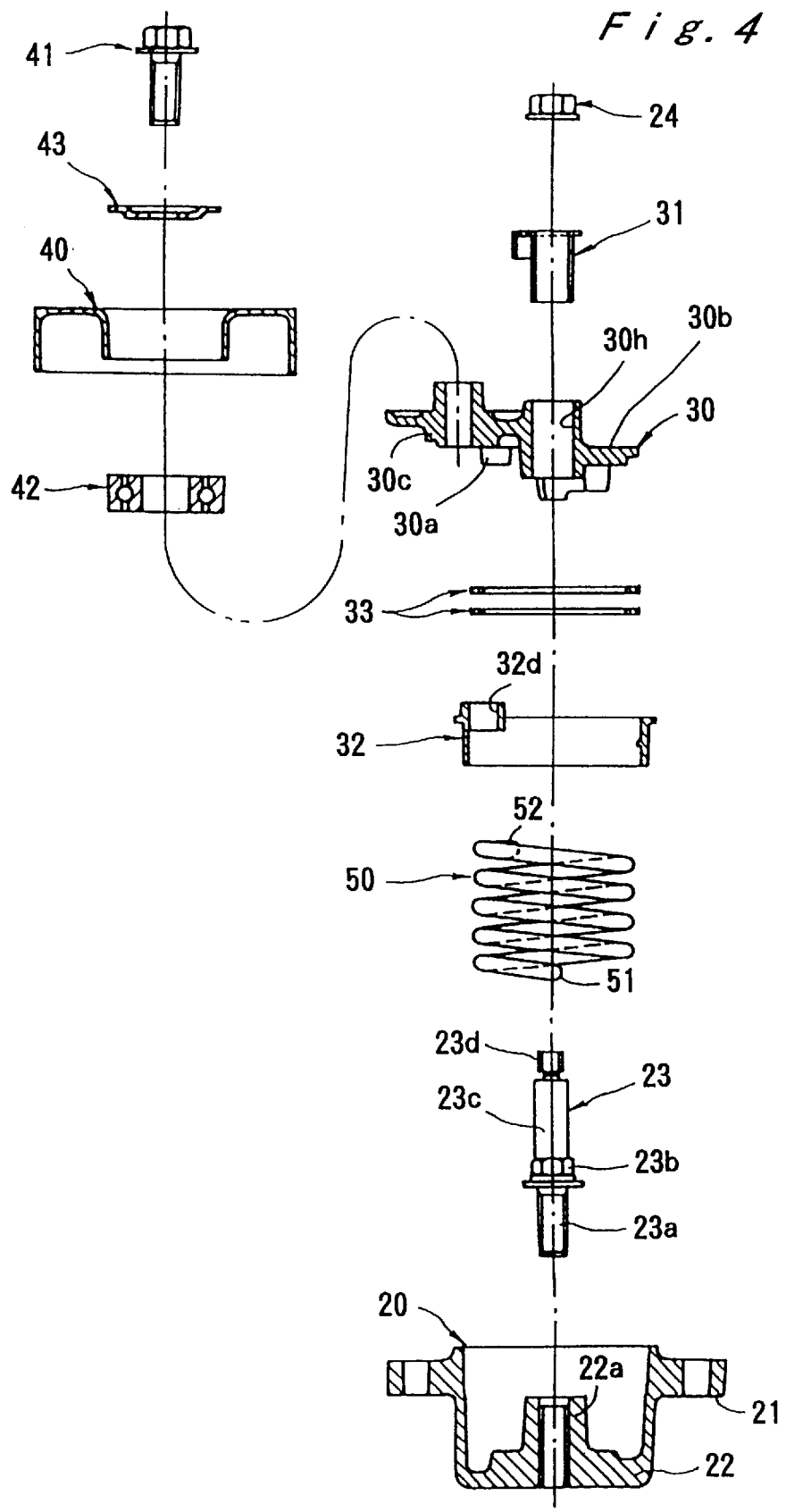
FIG. 4 is an exploded view of the belt tensioner of FIG. 3.

FIG. 3 shows an internal construction of the belt tensioner 10 according to the present invention, and FIG. 4 shows the main parts of the belt tensioner 10 in an exploded view. As shown in these drawings, the tensioner arm 30 includes a lid portion 30b extended so as to close an opening area of the tensioner cup 22, and a pulley mounting portion 30c rotatably supporting the pulley 40. The annular damping member 32 is securely attached to the lid portion 30b, and is in sliding contact with the circumferential surface of the tensioner cup 22 near the opening area thereof.

The tensioner cup 22 has a raised portion 22a integrally formed at the center of the bottom thereof, and the pivot bolt 23 is screwed into the raised portion 22a. The pivot bolt 23 has a threaded section 23a formed at a lower end portion thereof, and a hexagonal section 23b formed at an approximate center. The threaded section 23a of the pivot bolt 23 is screwed into the raised portion 22a by applying a suitable tool such as a wrench, spanner or the like to the hexagonal section 23b. The screwing of the threaded section 23a into the raised portion 22a is performed until the hexagonal section 23b abuts against a top end of the raised portion 22a. Thus, the pivot bolt 23 is securely planted in and joined to the bottom of the tensioner cup 22.

The pivot bolt 23 further has a circular columnar section 23c extended upward from the hexagonal section 23b, and the circular columnar section 23c terminates a second threaded portion 23d at an upper end thereof (FIG. 4). The circular columnar section 23c is inserted into a bushing 31 received in a central hole 30h formed in the lid portion 30b of the tensioner arm 30. A nut 24 is screwed over the second threaded portion 23d of the pivot bolt 23, and thus an axial movement of the bushing 30h is prevented. Nevertheless, the bushing 30h is rotationally slidable against a given frictional resistance. Thus, the tensioner arm 30 is swingable around the pivot bolt 23 with respect to the stationary member 20. Note that an upper O-ring and a lower O-ring may be inserted above and below the pivot bushing 31.

The torsion spring 50 is composed of a metal wire wound in a spiral shape. One end 51 of the torsion spring 50 is affixed to the bottom of the tensioner cup 22, and the other end 52 (FIG. 4) thereof is affixed to the tensioner arm 30. The torsion spring 50 is inserted in a suitably-stressed state between the tensioner cup 22 and the tensioner arm 30, and thus the tensioner arm 30 is rotationally urged in a direction to tension the drive belt (not shown in FIGS. 2 and 4) suspended over the tensioner pulley 40. Of course, the thickness, material, shape, etc. of the metal wire of the torsion spring 50 are suitably selected in accordance with the rotational urging force required.

As shown in FIG. 3, the pulley 40 is rotatably attached to the pulley mounting portion 30c of the tensioner arm 30 by the pulley bolt 41 through the intermediary of a ball bearing 42. A dust shield member 43 is inserted between the head of the pulley bolt 41 and the ball bearing 42, and thus penetration and entry of dust, dirt or the like into the ball bearing 42 can be prevented.

The damping member or friction member 32, attached to the lid portion 30b of the tensioner arm 30, is formed of a suitable elastic material such as a plastic or rubber. For example, use is made of polyacetal, nylon containing molybdenum for imparting self-lubrication, other polymer material, superior strength glass fiber reinforced nylon or carbon fiber reinforced plastic, etc. Nevertheless, it is very preferable to form the damping member 32 of a partially-aromatic polyamide resin material such as polyhexamethylene telephtalic amide or the like, for the reasons stated hereinafter.

Two circular holes 32d are formed in the damping member 32 so as to extend in the axial direction, and are arranged in the vicinity of the inner circumferential surface of the damping member 32. On the other hand, at least two projections or circular columnar pins 30a are protruded from the lid portion 30b of the tensioner arm 30, and are inserted into the circular holes 32d with substantially no clearance therebetween. Namely, an inner diameter of the circular holes 32d is substantially equal to an outer diameter of the circular columnar pins 30a. Thus, the damping member 32 can be effectively prevented from being moved in both the rotational and radial directions with respect to the lid portion 30b, due to the insertion of the pins 30a into the holes 32d.

The outer circumferential surface 32a of the damping member 32 is in sliding contact with the inner circumferential surface 22b of the tensioner cup 22. Two C-shaped ring springs 33 are attached in a radially-inward compressed state at the inner circumferential surface of the annular damping member 32, so that the damping member 32 is urged and pressed against the inner circumferential surface of the tensioner cup 22 by a substantially uniform and constant pressure. Thus, during the swing movement of the tensioner arm 30, a damping force is produced as a frictional force between the damping member 32 and the tensioner cup 22. Of course, an urging force of the ring springs 33 is suitably set in accordance with the required damping force.

Figure 5:
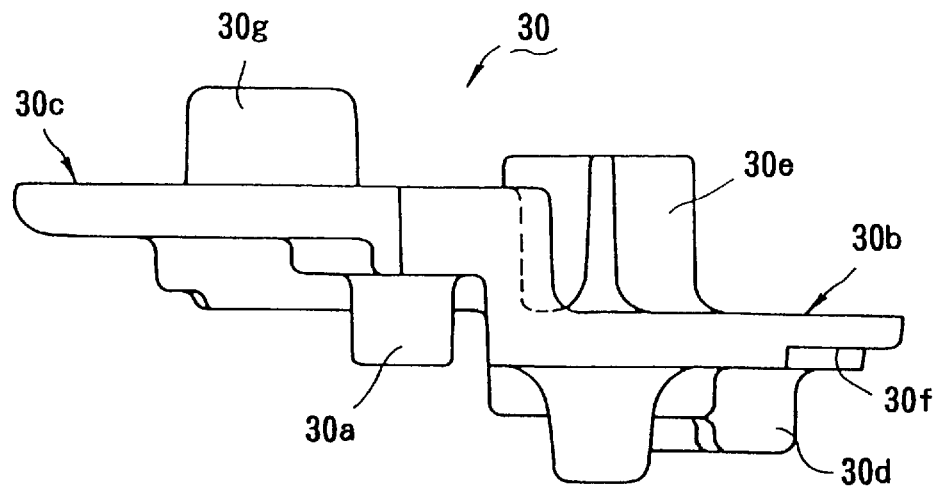
FIG. 5 is a side view showing a tensioner arm of the belt tensioner of FIG. 3.
Figure 6:
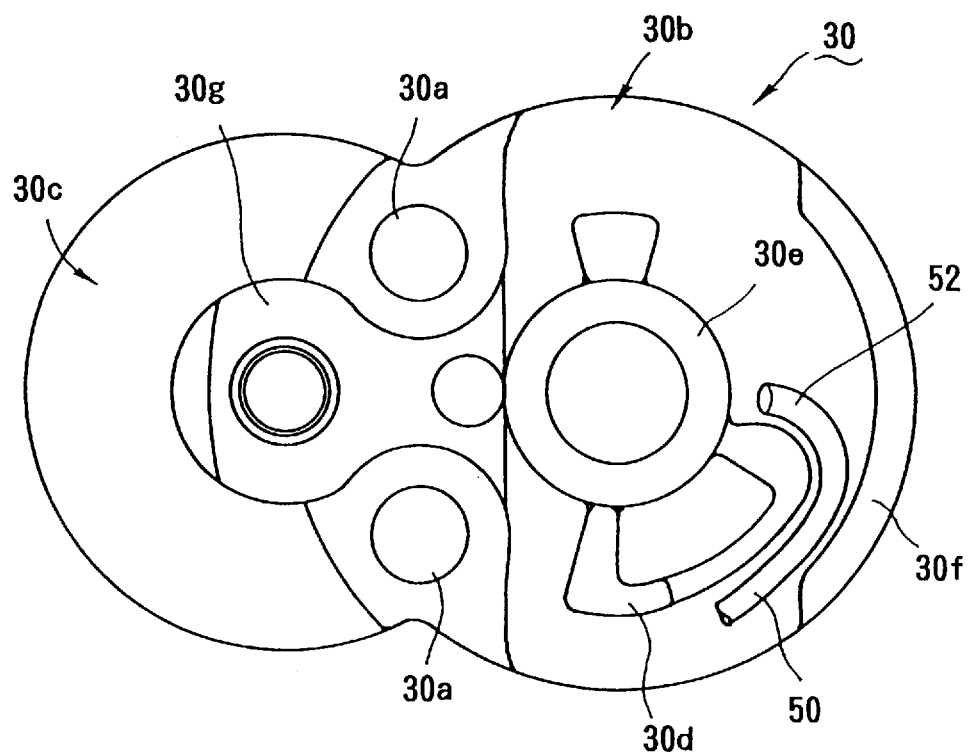
FIG. 6 is a plan view of the tensioner arm of FIG. 5.

FIGS. 5 and 6 show an external appearance of the tensioner arm 30 including the lid portion 30b and the pulley mounting portion 30c, which is integrally formed of a suitable metal material. The lid portion 30b has a projection 30d protruding from a side face thereof, and the projection 30d is in engagement with the end 52 of the torsion spring 50 when assembling the tensioner arm 30 in the tensioner 10. Also, the lid portion 30b has a cylindrical pivot bolt support 30e projecting from the center thereof, and the bushing 31 is received in the support 30e. Further, the lid portion 30b is formed with a guide groove 30f extended along an outer periphery thereof at the side opposite to the pulley mounting portion 30c of the lid portion 30b. The projections or circular columnar pins 30a protruding from the lid portion 30b are opposed to the guide groove 30f, and are oriented in the axial direction of the tensioner cup 22 when assembling the tensioner arm 30 in the tensioner 10. The pulley mounting portion 30c has a pulley bolt bearing 30g formed at the center thereof, and the pulley bolt 41 for the tensioner pulley 40 is screwed into the pulley bolt bearing 30g.

Figure 7:
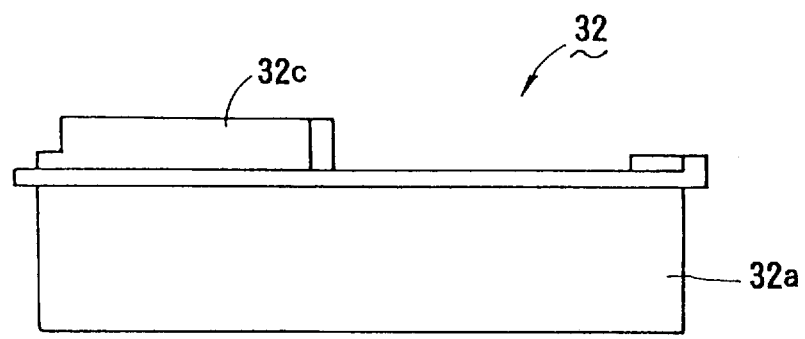
FIG. 7 is a side view showing an annular damping member of the belt tensioner of FIG. 3.
Figure 8:
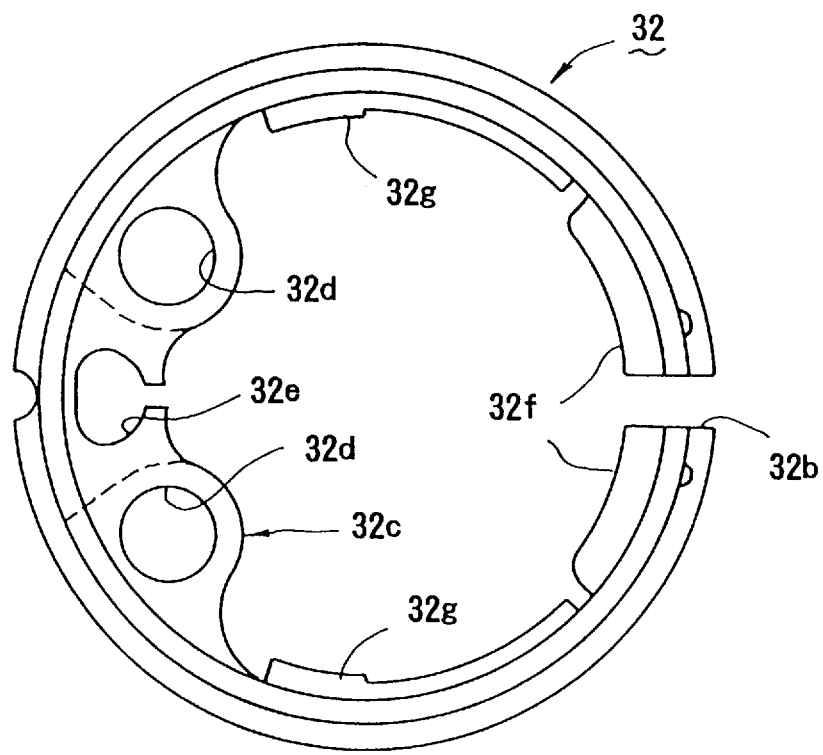
FIG. 8 is a plan view of the annular damping member of FIG. 7.

FIGS. 7 and 8 show an external appearance of the damping member 32. As is apparent from these drawings, although the damping member 32 has an annular shape following the opening of the tensioner cup 22, it is split so that a gap 32b is formed therein. The gap 32b contributes to absorb heat deformation of the damping member 32, and also serves as a draining passage for draining water penetrating into the tensioner cup 22.

The damping member 32 has an insertion portion 32c integrally formed along an inner periphery thereof at the side opposite to the gap 32b of the damping member 32. As is apparent from FIG. 7, the insertion portion 32c is extended from the side of the annular body per se of the damping member 32 which is applied to the lid portion 30b of the tensioner arm 30 when assembling the damping member 32 in the tensioner 10. As is apparent from FIG. 8, the above-mentioned circular holes 32d are formed in the insertion portion 32c, and are arranged at equal positions in the radial direction offset from the center of the damping member 32. The central axes of the circular holes 32d are parallel to the pivot bolt 23 when assembling the damping member 32 in the tensioner 10. Further, a groove 32e is formed in the insertion portion 32c, and contributes to absorb a deformation of the insertion portion 32c.

The damping member 32 has a pair of sector-shaped elements 32f integrally formed on the inner circumferential surface thereof, and the sector-elements 32f are arranged at the sides of the gap 32b. The sector-shaped elements 32f are slidably received in the guide groove 30f formed in the lid portion 30b of the tensioner arm 30 when assembling the damping member 32 in the tensioner 10. The damping member 32 has another pair of sector-shaped elements 32g integrally formed on the inner circumferential surface thereof, and the sector-shaped elements 32g serve as a ring receiver for the ring springs 33. The sector-shaped elements 32g are positioned below the ring springs 33 to prevent the ring springs 33 from shifting downward (FIG. 3).

Figure 9:
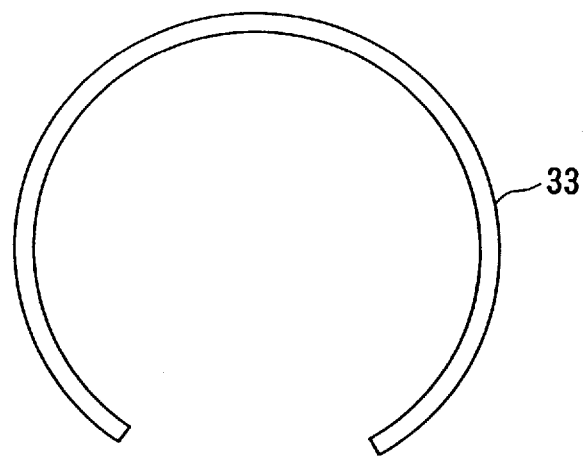
FIG. 9 is a plan view showing one type of C-shaped ring spring.
Figure 10:
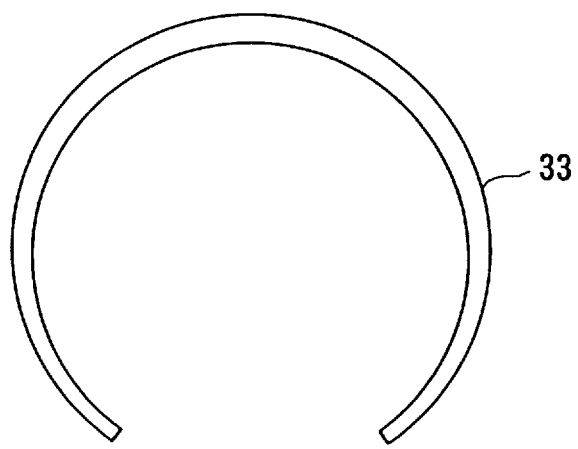
FIG. 10 is a plan view showing another type of C-shaped ring spring.

FIG. 9 shows one type of C-shaped ring spring 33 having a uniform width, and FIG. 10 shows another type of C-shaped ring spring 33 having a maximum width at a middle location thereof, and a varying width gradually reducing from the middle location to the ends. Either of the two types may be incorporated in the damping member 32. Of course, although not illustrated, yet another type of ring spring may be used in the tensioner 10.

Figure 11:
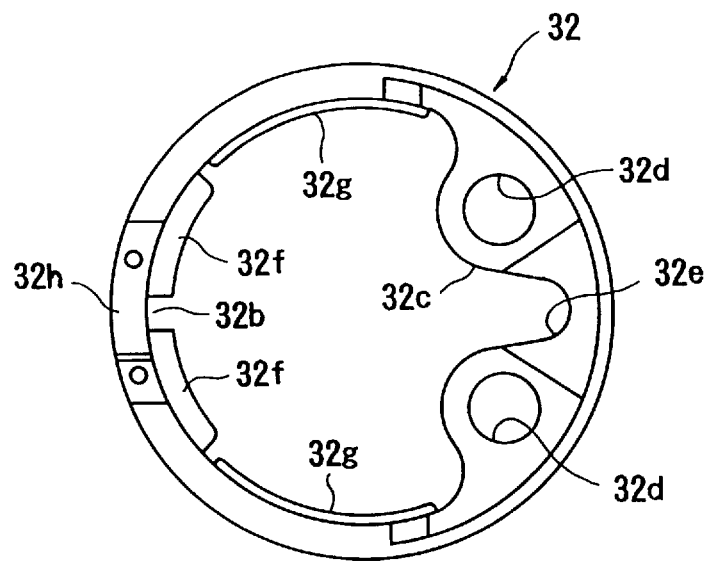
FIG. 11 is a plan view showing another embodiment of the annular damping member.
Figure 12:
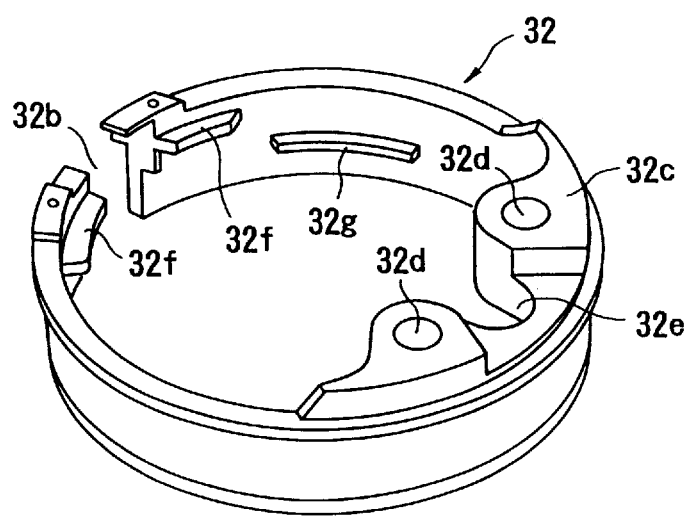
FIG. 12 is a perspective view of the annular damping member shown in FIG. 11.

FIGS. 11 and 12 show another embodiment of the damping member 32 which is composed of elements similar to those of FIGS. 7 and 8 and indicated by the same references. In this embodiment, the split gap 32b of the damping member 32 is bridged by a span element 32h extended from one of the opposed outer end edges defining the gap 32b and coming in sliding engagement with the other end edge.

When the damping member 32 shown in FIGS. 7 and 8 is assembled in the tensioner 10, as shown in FIG. 3, the split gap 32b of the damping member 32 appears as a small opening at a location along the outer periphery of the lid portion 30b of the tensioner arm 30. Then, debris, fragments or the like may penetrate into the interior of the tensioner cup 22 through the small opening or split gap 32b of the damping member 32. Nevertheless, in the arrangement of the damping member 32 as shown in FIGS. 11 and 12, no opening appears at a location along the outer periphery of the lid portion 30b of the tensioner arm 30, due to the existence of the span element 32h. Thus, the penetration of debris, fragments or the like into the tensioner cup 22 through the gap 32b is prevented.

When the belt tensioner 10 is incorporated in the belt driving system as shown in FIG. 1, the tensioner arm 30 is rotationally urged by the resilient force of the torsion spring 50 such that the driving belt 7 is tensioned by the tensioner pulley 40 engaged therewith. During the operation of the belt driving system, the tensioner arm 30 is inevitably subjected to the vibration or oscillation from the driving belt 7, but the vibration or oscillation of the tensioner arm 30 can be effectively damped due to the damping force positively produced by the ring spring 33 between the inner circumferential surface of the tensioner cup 22 and the outer circumferential surface of the damping member 32.

When the belt tensioner 10 is being used, the outer circumferential surface 32a of the damping member 32 wears down. Nevertheless, according to the first aspect of the present invention, no clearance is produced between the damping member 32 and the lid portion 30b of the tensioner arm 30 because the damping member 32 spreads outward due to the action of the ring spring 33 by exactly the amount of the wear, and because the holes 32d of the damping member 32 fit over the pins 30a. Accordingly, noise produced by any clearance at the time of swinging of the tensioner arm 30 is prevented.

Since the insertion portion 32c is extended from the annular body per se of the damping member 32, as mentioned above, i.e., since the insertion portion 32c is formed above the outer circumferential surface 32a of the damping member 32 coming in sliding contact with the inner circumferential surface of the tensioner cup 22, the insertion portion 32c is resistant to the effects of the relative movement of the damping member 32 due to wear of the outer circumferential surface thereof.

Further, since the plurality of pins 30a of the tensioner arm 30 are inserted into the circular holes 32d, the force exerted on the damping member 32 by the torsion spring 50 during the swinging of the tensioner arm 30 is dispersed to a plurality of insertion locations (pins 30a), whereby premature damage and deterioration of the damping member can be prevented.

According to a second aspect of the present invention, a damping member 32 is formed of a partially-aromatic polyamide resin material having a coefficient of dynamic friction of at most 0.20, a critical pressure-velocity value (PV) of at least 1400, and a specific wear volume of at most 0.2, or a copolymer resin material including this partially-aromatic polyamide resin material. The partially-aromatic polyamide resin material may be defined as an aromatic polyamide resin material having methylene-bonds added to the main chain thereof, and is represented by polyhexamethylene telephtalic amide (nylon 6T) or the like. The partially-aromatic polyamide resin material exhibits not only high resistance to abrasion and wear but also superior processability in production of articles. Note, the aromatic polyamide resin material exhibits high resistance to abrasion and wear, but it has inferior processability in production of articles. In short, the present invention is also directed to a belt tensioner comprising the damping member 32 formed of the partially-aromatic polyamide resin material having the above-mentioned characteristics.

To prove the merits or advantage of the belt tensioner according to the second aspect of the present invention, the following endurance test was carried out.

First, in accordance with the second aspect of the present invention, a belt tensioner having a damping member formed of polyhexamethylene telephtalic amide (APA or nylon 6T) was actually assembled, and this damping member had a coefficient of dynamic friction of about 0.16, a critical pressure-velocity value (PV) of 1600, and a specific wear volume of about 0.16. As a first comparative example, a belt tensioner having a damping member formed of polyamide (PA) was actually assembled, and this damping member had a coefficient of dynamic friction of about 0.40, a critical pressure-velocity value (PV) of 450, and a specific wear volume of about 0.3. As a second comparative example, a belt tensioner having a damping member formed of polyacetal (POM) was actually assembled. In this belt tensioner, the damping member had a coefficient of dynamic friction falling in the range between about 0.18 and about 0.25, a critical pressure-velocity value falling in the range between about 450 to about 1200, and a specific wear volume falling in the range between about 0.1 to about 0.3. Namely, the summary is shown in the following table.

|  | Coefficient of Dynamic Friction | Critical PV | Specific Wear Volume |
| --- | --- | --- | --- |
| Invention (APA) | 0.16 | 1600 | 0.16 |
| PA | 0.40 | 450 | 0.3 |
| POM | 0.18~0.25 | 450~1200 | 0.1~0.3 |

These numerical characteristics were experimentally obtained in accordance with the JIS (Japanese Industrial Standard) K 7218 method.

Figure 13:
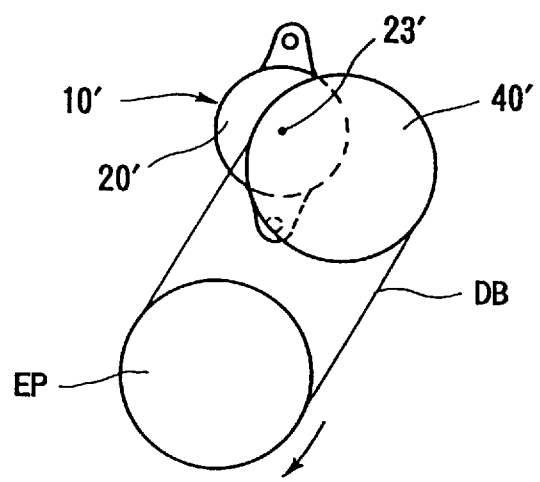
FIG. 13 is a schematic view showing an endurance test machine for testing a belt tensioner according to a second aspect of the present invention.

Each of the belt tensioners as mentioned above was tested by an endurance test machine, as shown in FIG. 13. In this endurance test machine, reference 10' indicates a belt tensioner to be tested, and the belt tensioner 10' includes a stationary member 20', and a tensioner pulley 40' swingable around an axis of a swing shaft 23'. The pulley 40' is rotationally driven by an eccentric pulley EP through a driving belt DB. The endurance test was carried out under the following conditions:

(a) sliding speed at the sliding surfaces of the damping member and tensioner cup: 21 cm/s (b) sliding pressure exerted from the damping member to the tensioner cup: 5 kgf/cm$^2$ (c) amount of relative sliding motion between the damping member and tensioner cup: 4.1 mm The sliding speed (21 cm/s) depends upon a running speed of the driving belt DB; the sliding pressure depends upon a modules of elasticity of a torsion spring provided in the damping member concerned; and the amount of relative sliding motion depends upon an eccentricity of the eccentric pulley EP.

Figure 14:
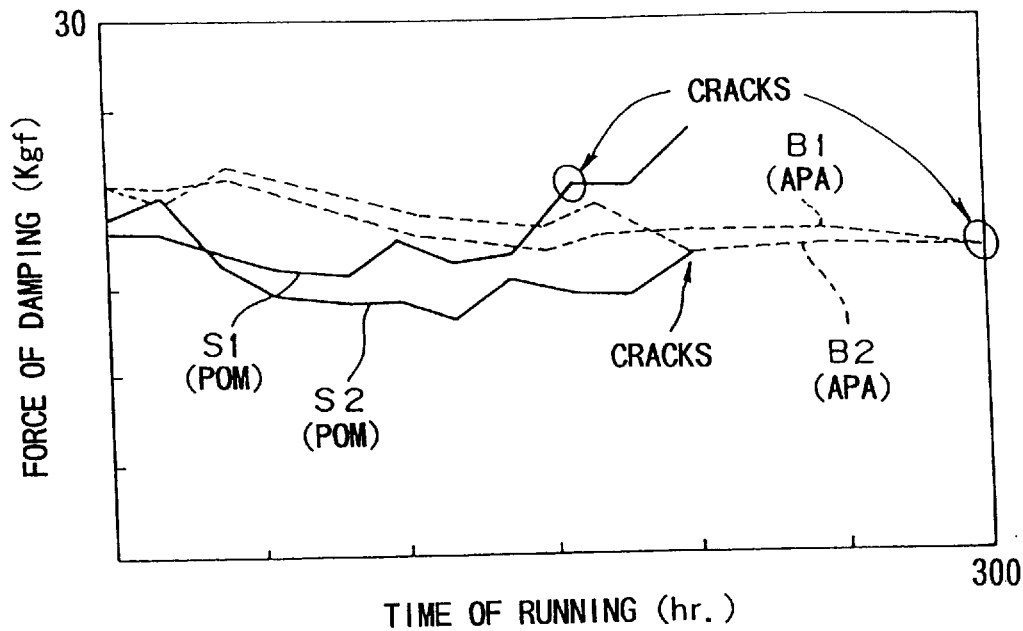
FIG. 14 is a graph showing a part of the results of the endurance test carried out by the endurance test machine.
Figure 15:
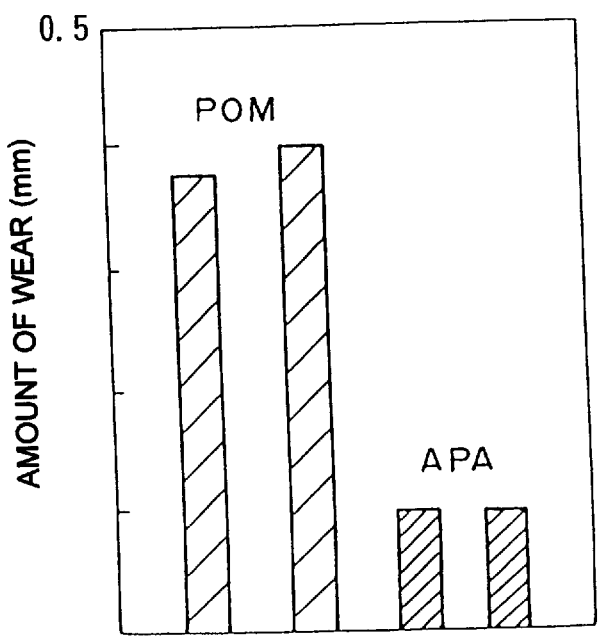
FIG. 15 is a graph showing another part of the results of the endurance test carried out by the endurance test machine.

Each of the endurance tests was carried out over a period of time of 300 hours, and FIGS. 14 and 15 show the results of the endurance tests. In the graph of FIG. 14, the S1 and S2 represent the belt tensioner having the damping member formed of polyacetal (POM), and B1 and B2 represent the belt tensioner having the damping member formed of polyhexamethylene telephtalic amide (APA). In the belt tensioner having the POM damping member, after a running time of from about 150 to about 200 hours, cracks were produced in the insert portion (32c) of the damping member in which the circular holes (32) are formed. On the contrary, in the belt tensioner having the APA damping member, no cracks were produced until a running time of 300 hours had elapsed. In the graph of FIG. 15, the APA damping member has a considerably large amount of wear in comparison with that of the POM damping member.

Finally, it will be understood by those skilled in the art that the foregoing description is of preferred embodiments of the present invention, and that various changes and modifications may be made to the present invention without departing from the spirit and scope thereof.

The present disclosure relates to subject matter contained in Japanese Patent Applications No. 7-171359 (filed on Jun. 14, 1995), and No. 7-299206 (filed on Oct. 23, 1995) which are expressly incorporated herein, by reference, in their entirety.

I claim:

1. A belt tensioner comprising:
   a tensioner cup having an opening;
   a tensioner arm having a lid portion formed at one end, said lid portion being rotatably connected to said tensioner cup and extending so as to close said opening of said tensioner cup;
   elastic urging means provided in said tensioner cup to act between said tensioner cup and said tensioner arm so as to elastically urge said tensioner arm in a rotational direction; and
   a damping member secured to said lid portion of said tensioner arm such that an outer circumferential surface of said damping member is in sliding contact with an inner circumferential surface of said tensioner cup,
   wherein said lid portion of said tensioner arm is provided with at least two columnar pin-like elements protruding parallel to a swing axis of said lid portion of said tensioner arm, and said columnar pin-like elements inserted in holes formed in said damping member, whereby said damping member is prevented from being moved in both rotational and radial directions with respect to said lid portion of said tensioner arm.

2. A belt tensioner as set forth in claim 1, wherein said columnar pin-like elements and said holes are arranged at positions offset from a center of said damping member.

3. A belt tensioner as set forth in claim 2, wherein said columnar pin-like elements and said holes are disposed at equal positions in the radial direction from said center of said damping member.

4. A belt tensioner as set forth in claim 1, wherein said damping member has an insertion portion integrally formed therewith, and said holes are formed in said insertion portion thereof.

5. A belt tensioner as set forth in claim 4, wherein said insertion portion of said damping member is arranged along an inner periphery of said damping member.

6. A belt tensioner as set forth in claim 5, wherein said damping member comprises an annular body, and said insertion portion of said damping member extends integrally from a side of said annular body.

7. A belt tensioner as set forth in claim 6, wherein said annular body is split so as to form a gap therein, and said insertion portion of said damping member is diametrically arranged at a side opposite to said gap of said annular body.

8. A belt tensioner as set forth in claim 1, further comprising at least one ring-like spring element provided in said damping member such that said outer circumferential surface of said damping member is elastically urged against an inner circumferential surface of said tensioner cup.

9. A belt tensioner as set forth in claim 8, wherein said ring-like spring comprises a C-shaped ring spring.

10. A belt tensioner as set forth in claim 1, wherein said holes of said damping member fit over said columnar pin-like element with substantially no clearance therebetween.

11. A belt tensioner as set forth in claim 10, wherein said holes of said damping member and columnar pin-like elements have a circular cross-section.

12. A belt tensioner comprising:
    a tensioner cup having an opening;
    a tensioner arm having a lid portion formed at one end, said lid portion being rotatably connected to said tensioner cup and extended so as to close the opening of said tensioner cup;
    an elastic urging means provided in said tensioner cup to act between said tensioner cup and said tensioner arm so as to elastically urge said tensioner arm in a rotational direction; and
    a damping member securely attached to the lid portion of said tensioner arm such that an outer circumferential surface of said damping member is in sliding contact with an inner circumferential surface of said tensioner cup;
    wherein said damping member is formed of a partially-aromatic polyamide resin having a coefficient of dynamic friction of at most 0.20, a critical pressure-velocity value (PV) of at least 1400, and a specific wear volume of at most 0.2.

13. A belt tensioner as set forth in claim 12, wherein the coefficient of dynamic friction is about 0.16.

14. A belt tensioner as set forth in claim 12, wherein the critical pressure-velocity value (PV) is about 1600.

15. A belt tensioner as set forth in claim 12, wherein the specific wear volume is about 0.16.

16. A belt tensioner as set forth in claim 12, wherein said tensioner cup is formed of a metal.

17. A belt tensioner as set forth in claim 12, wherein said metal is aluminum alloy.

* * * * *